United States Patent
Bordewisch et al.

(10) Patent No.: US 8,028,016 B2
(45) Date of Patent: Sep. 27, 2011

(54) ABSENCE ASSISTANCE SYSTEM FOR MULTIMEDIA-ENABLED COMMUNICATION SYSTEMS

(75) Inventors: Uwe Bordewisch, Stemwede-Wehdem (DE); Holger Hoffmann, Schwerte (DE); Ulrich Leimkötter, Gelsenkirchen (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 289 days.

(21) Appl. No.: 11/991,825

(22) PCT Filed: Aug. 24, 2006

(86) PCT No.: PCT/EP2006/065630
§ 371 (c)(1),
(2), (4) Date: Mar. 11, 2008

(87) PCT Pub. No.: WO2007/036403
PCT Pub. Date: Apr. 5, 2007

(65) Prior Publication Data
US 2009/0265454 A1    Oct. 22, 2009

(30) Foreign Application Priority Data
Sep. 28, 2005 (DE) .......................... 10 2005 046 441

(51) Int. Cl.
*G06F 15/16* (2006.01)
*G06F 15/173* (2006.01)
(52) U.S. Cl. ........................ 709/201; 709/223
(58) Field of Classification Search .......... 709/201, 709/206, 223, 224; 379/88.17, 88.11, 88.18, 379/88.22, 900
See application file for complete search history.

(56) References Cited

U.S. PATENT DOCUMENTS

| 2004/0156485 A1* | 8/2004 | Poustchi et al. | 379/88.14 |
| 2006/0067249 A1* | 3/2006 | Poustchi et al. | 370/260 |

FOREIGN PATENT DOCUMENTS

| EP | 1 109 391 A2 | 6/2001 |
| WO | WO 2005/050952 A1 | 6/2005 |

OTHER PUBLICATIONS

P. Matthews and B. Poustchi, "Industrial-Strength P2P SIP", IETF Standard-Working-Draft, Internet Engineering Task Force, IETF, Feb. 11, 2005, pp. 1-9, XP015032234.
Singh K et al., "Peer-to-Peer Internet Telephony using SIP", Internet Citation (Oct. 31, 2000), XP002336408, URL:http://wwwl.cx.columbia.edu/library/TR-repository/reports/reports-2004/cucs-044-04.pdf pp. 2,3, 13, 14; Others; 2005.

* cited by examiner

*Primary Examiner* — Yemane Mesfin

(57) ABSTRACT

The absence assistance system for at least one multimedia-enabled communication system comprising a plurality of packet-oriented client communication systems, in which the packet-oriented client communication systems support at least in part different multimedia services and at least one multimedia service of a packet-oriented client communication system is in each case assigned to at least one communication subscriber, has in each case at least one absence assistance unit per packet-oriented client communication system, the packet-oriented client communication systems being connected to one another via a peer-to-peer transmission protocol. The absence assistance units manage, in the absence of a communication subscriber, the communication connections directed to the absent communication subscriber via the at least one assigned multimedia service.

15 Claims, 1 Drawing Sheet

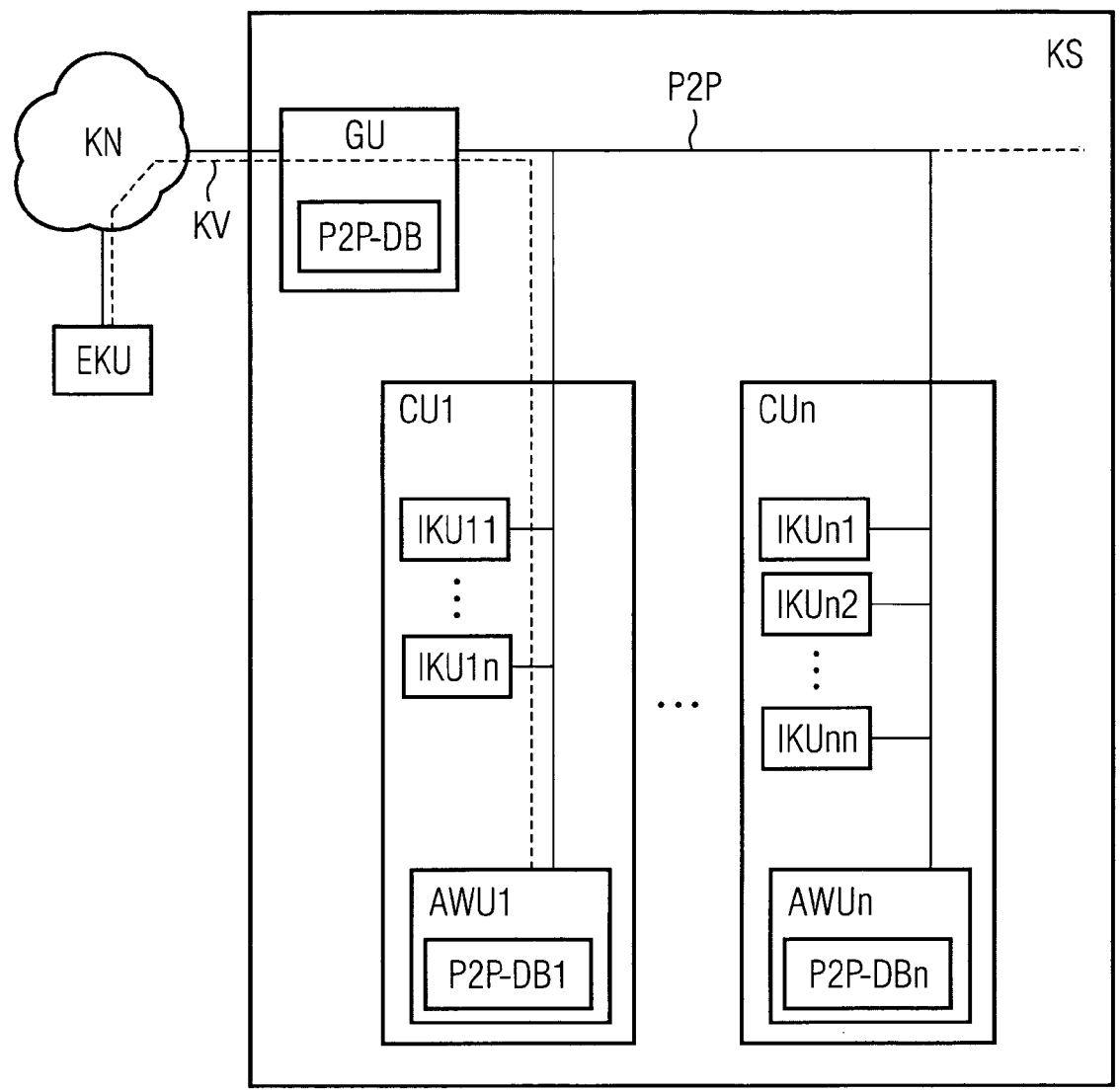

ABSENCE ASSISTANCE SYSTEM FOR MULTIMEDIA-ENABLED COMMUNICATION SYSTEMS

CROSS REFERENCE TO RELATED APPLICATIONS

This application is the US National Stage of International Application No. PCT/EP2006/065630, filed Aug. 24, 2006 and claims the benefit thereof. The International Application claims the benefits of German application No. 10 2005 046 441.6 DE filed Sep. 28, 2005, both of the applications are incorporated by reference herein in their entirety.

FIELD OF INVENTION

The invention relates to an absence assistance system for at least one communication system consisting of a number of packet-oriented client communication systems, wherein the packet-oriented client communication systems support different multimedia services at least in part. Also at least one multimedia service of a packet-oriented client communication system is assigned respectively to at least one communication subscriber.

BACKGROUND OF INVENTION

Absence assistance systems to date have a central absence assistance unit, for example a voicemail server unit arranged centrally within a communication system, by way of which media-specific management takes place, for example by voice services, of the multimedia communication connections received in the absence of the communication subscriber in question. Such central solutions are however technically complex and require cost-intensive server units, which can develop a performance-limiting bottleneck due to their central arrangement in the communication system.

Multimedia-enabled communication systems respectively support one or more multimedia services, which allow multimedia communication, i.e. the setting up of multimedia communication connections by way of different media transmission channels. Examples of such multimedia services that should be mentioned here are voice services, data services, audio services, video services, information services and program communication services.

The different multimedia services are generally implemented with the aid of specific communication protocols. The provision of such multimedia services places high demands on the performance capacity of the corresponding communication facilities, in particular their absence assistance systems, due to the high data throughput rates and required storage capacities.

Peer-to-peer communication networks are also known, in which data communication takes place according to the peer-to-peer transmission protocol. In contrast to client/server architectures, in a communication network based on peer-to-peer technology every computer can be a peer that can function as client and server at the same time. A peer-to-peer communication network can be one of two types—a pure or hybrid peer-to-peer communication network. The pure variant has no centralized entities, while with the hybrid solution one (or a small number of linked) directory server unit(s) is/are provided in the communication system, providing an additional network service.

SUMMARY OF INVENTION

The object of the present invention is to specify an absence assistance system for a multimedia-enabled communication system, wherein the multimedia communication connections of different types directed to a communication subscriber in the absence of said communication subscriber are managed in a resource-saving and efficient manner. According to the invention the object is achieved on the basis of the independent claims.

The significant aspect of the inventive absence assistance system consists of the fact that the packet-oriented client communication systems are connected to each other by way of a peer-to-peer transmission protocol. Also in each packet-oriented client communication system the absence assistance system has at least one absence assistance unit respectively, which in the absence of a communication subscriber manages the communication connections directed to said absent communication subscriber by way of the at least one multimedia service assigned to the communication subscriber. This advantageously replaces a central absence assistance system for a plurality of communication subscribers within a multimedia-enabled communication system, for example a private branch exchange, with individual absence assistance units provided in the packet-oriented client communication units, which deal locally with management of the communication connections arriving in the absence of a communication subscriber by way of the latter's assigned multimedia services. Such a decentralized solution to the management of multimedia communication connections in the absence of a communication subscriber within one of a number of client communication systems, for example a local area network or wireless local area network, allows the multimedia resources available therein to be utilized effectively to store and transmit received multimedia data.

In a further advantageous embodiment the absence assistance system has what is known as a peer-to-peer database, which is configured redundantly and arranged within the multimedia-enabled communication system in a distributed manner. In particular peer-to-peer database units are assigned at least to the absence assistance units and the at least one gateway unit in the respective client communication systems.

Also advantageously each absence assistance unit has at least one search request functionality, by way of which it is possible to determine available multimedia resources in adjacent client communication systems.

BRIEF DESCRIPTION OF THE DRAWINGS

The invention is described in more detail below based on a schematic block circuit diagram with reference to an exemplary embodiment.

DETAILED DESCRIPTION OF INVENTION

The FIGURE shows a schematic diagram of an example of a multimedia-enabled communication system KS, e.g. a private branch exchange for up to 100 communication subscribers for example, linked for example by way of a gateway unit GU to a communication network KN, e.g. a public communication network.

The communication network KN is generally based on time-slot-oriented or packet-oriented transmission technology. The multimedia-enabled communication system KS preferably has a packet-oriented transmission technology. To this end a for example multimedia communication connection KV is implemented within the multimedia-enabled communication system KS by a two-way transmission and receipt of data packets—containing payload and/or signaling information—between a first and second communication terminal. The individual data packets contain among other things information about the destination address of the respective other communication terminal.

To determine the routing within the packet-oriented, multimedia-enabled communication system KS, the gateway unit GU is provided, being configured to determine the routing of data packets containing payload, in particular data packets containing multimedia data, as well as determining the routing of data packets containing signaling data. In particular the gateway unit GU has means for converting data streams received from the communication network KN to suitable data packets and vice versa. The information required for conversion is stored in a peer-to-peer database P2P-DB provided in the gateway unit GU.

The multimedia-enabled communication system KS has a number of packet-oriented client communication systems CU1-CUn, each supporting different multimedia services at least in part and connected to each other by way of a peer-to-peer transmission protocol P2P. The gateway unit GU is likewise connected by way of the peer-to-peer transmission protocol P2P to the packet-oriented client communication systems CU1-CUn.

The peer-to-peer transmission protocol P2P gives all the client communication systems CU1-CUn provided in the multimedia-enabled communication system KS equal authorization, allowing them both to draw upon multimedia services and to supply multimedia services. In contrast to client-server technology, in a communication system KS based on peer-to-peer technology every packet-oriented client communication system CU1-CUn can be a peer, which can function as client and server at the same time in a communication network.

The packet-oriented client communication systems CU1-CUn can have a different technical structure. For example they can be configured as a local area network or wireless local area network. Thus the packet-oriented client communication systems CU1-CUn form small independent packet-oriented communication systems, having networked internal client-specific terminals IKU11-IKU1$n$, IKUn1-IKUnn and for example one or more peer-to-peer database units P2P-DB1-P2P-DBn.

The internal client-specific communication terminals IKU11-IKU1$n$, IKUn1-IKUnn can be realized as wired or mobile terminals, for example voice and/or video telephones, computer units, fax devices, cordless telephones, printer units, etc. These each support different multimedia services, for example voice services, audio services, video services, information services, data services or control services.

At least one external multimedia-enabled communication terminal EKU is also linked to the communication network KN. Multimedia communication connections KV for example are set up by way of the communication network KN and the gateway unit GU between the external multimedia-enabled communication terminal EKU and at least one internal client-specific communication terminal IKU11, with one or more multimedia services being required for their data transmission. For example a video telephone connection can be set up from the external multimedia-enabled communication terminal EKU to a communication subscriber of the multimedia-enabled communication system KS, requiring the provision of a video data service.

At least one multimedia service is assigned respectively to a communication subscriber within the multimedia-enabled communication system KS, preferably supported by a predetermined packet-oriented client communication system CU1-CUn. A communication subscriber can therefore draw upon a number of multimedia services within the multimedia communication system KS by way of internal multimedia-enabled communication terminals IKU11-IKU1$n$, IKUn1-IKUnn arranged in different packet-oriented client communication systems CU1-CUn and these are preferably managed by way of a packet-oriented client communication system CU1-CUn.

According to the invention the multimedia-enabled communication system KS has an absence assistance system to manage the multimedia services of a communication subscriber in their absence, said absence assistance system consisting of a number of absence assistance units AWU1-AWUn, which are provided respectively in the packet-oriented client communication systems CU1-CUn to manage communication connections, for example telephone calls, video calls or information services, received in the absence of a communication subscriber. At least one peer-to-peer database unit P2P-DB1-P2P-DBn is assigned respectively to the absence assistance units AWU1-AWUn provided in the packet-oriented client communication systems CU1-CUn, in which the criteria to be used to handle a communication connection KV directed to a communication subscriber in the latter's absence are stored in a subscriber-specific manner.

The entire peer-to-peer database P2P-DB, P2P-DB1-P2P-DBn of the multimedia-enabled communication system KS is therefore made up of the peer-to-peer database units P2P-DB1-P2P-DBn provided in the client communication systems CU1-CUn and the peer-to-peer database P2P-DB provided in the gateway unit GU.

The absence assistance units AWU1-AWUn are used to manage the multimedia communication connections KV of at least one communication subscriber received in the client communication systems CU1-CUn in respect of media type and available media service resources; in particular a search functionality implemented in the respective absence assistance unit AWU1-AWUn can also be used to determine additional media services and/or media service resources available in the adjacent client communication systems CU1-CUn and assign them to a received multimedia communication connection KV.

To activate the absence assistants a communication subscriber registers by way of an internal communication terminal IKU11-IKU1$n$, IKUn1-IKUnn with any absence assistance unit AWU1-AWUn of the client communication systems CU1-CUn, thereby establishing the competent client communication system CU1-CUn and/or its respective absence assistance unit AWU1-AWUn for managing their multimedia communication connections KV. The network address of the assigned client communication system CU1 is stored in the peer-to-peer database P2P-DB, P2P-DB1-P2P-DBn of the multimedia-enabled communication system KS. In a preferred embodiment the communication subscriber registers by inputting a log-in, for example a user ID and password, at the multimedia-enabled communication system KS. It is not transparent for the communication subscriber which client communication system CU1-CUn is provided to manage their multimedia data in their absence.

The multimedia services available in the local client communication system CU1 are then determined automatically by way of the absence assistance unit AWU1-AWUn of the assigned client communication system CU1-CUn and a search request is also initiated within the multimedia-enabled communication system KS in the further absence assistance units AWU2-AWUn of the adjacent client communication systems CU2-CUn, to determine the backup resources and/or replacement resources available in the adjacent client communication systems CU2-CUn and feed the search result back to the initiating absence assistance unit AWU1, for example in the form of the network addresses of the backup resources and/or replacement resources. The locally available multimedia services and the network addresses of the backup resources and/or replacement resources fed back are stored in the peer-to-peer database unit P2P-DB1 assigned to the initiating absence assistance unit AWU1.

If no available backup resources and/or replacement resources are determined, the communication subscriber or in some instances the system administrator is informed, so that they can initiate a corresponding extension of the multimedia-enabled communication system KS.

In the event of a multimedia communication connection KV directed to the absent communication subscriber, for example a video call from an external communication terminal EKU to the multimedia-enabled communication system KS, the gateway unit GU evaluates the information stored in the entire peer-to-peer database P2P-DB, P2P-DB1-P2P-DBn and first determines the client communication system CU1-CUn and/or the absence assistance unit AWU1-AWUn assigned to this, provided to manage the communication traffic of the absent communication subscriber, using the stored network address and then forwards the arriving multimedia communication connection KV to the determined client communication system CU1 and/or the absence assistance unit AWU1 assigned to this, in which further processing and/or storage of the received multimedia data takes place in a service-specific manner according to the criteria predetermined by the communication subscriber.

If the assigned client communication system CU1 fails, the corresponding network addresses of the backup resources and/or replacement resources, which are similarly stored in the entire peer-to-peer database P2P-DB, P2P-DB1-P2P-DBn, are determined and the arriving multimedia communication connections KV are forwarded to these.

When the failed client communication system CU1 is started up again, the multimedia data stored in the backup resources during the failure of a client communication system CU1 is automatically sent to the competent absence assistance unit AWU1 or transferred, after the subscriber has registered for example with a further client communication system CUn, to the absence assistance unit AWUn assigned to said client communication system CUn.

If the received multimedia communication connection KV requires a multimedia service, for example a video service required for a video data connection, and if this is not available in the client communication system CU1 assigned to the called communication subscriber, rerouting takes place, for example of the video channel required for the video data connection, to a further client communication system CUn, which supports the required multimedia service and still has free multimedia service resources. For example, in the absence of a video service, a system-specific standard parameter set provided in the further client communication system CUn can for example import a company logo into the video channel set up for this purpose.

Based on the described exemplary embodiment the allocation of absence assistance functionalities to individual absence assistance units AWU1-AWUn provided within the client communication system CU1-CUn allows a uniform external representation of the multimedia-enabled communication system KS to calling external communication subscribers.

Selected internal communication terminals IKU11-IKU1n, IKUn1-IKUnn for example can function as absence assistance units AWU1-AWUn, being specifically set up for this purpose.

Also the communication subscriber can select the multimedia services to be managed respectively in their absence and/or the communication terminals to be provided for this purpose.

The multimedia resources present within the inventive multimedia-enabled communication system KS are advantageously made available to a plurality of subscribers and therefore utilized more efficiently.

The invention was described above with reference to an exemplary embodiment. It goes without saying that numerous changes and modifications are possible without as a result departing from the inventive concept underlying the invention.

The invention claimed is:

1. An absence assistance system for a multimedia-enabled communication system, comprising:
    a plurality of packet-oriented client communication systems, each packet-oriented client communication systems supporting different multimedia services at least in part;
    an absence assistance unit provided in each packet-oriented client communication system of the plurality of packet-oriented client communication systems, each absence assistance unit assigned to at least one communication subscriber and managing at least one communication connection directed to that at least one communication subscriber when that at least one communication subscriber is absent; the absence assistance unit having at least one send request functionality such that the absence assistance unit determines available multimedia resources in at least one of the plurality of packet-oriented client communication systems in which that absence assistance unit is not provided to determine available multimedia services required by the at least one communication connection that is not supported by the packet-oriented client communication system in which that absence assistance unit is provided and forward the at least one communication connection to another absence assistance unit provided in another packet-oriented client communication system that supports the required multimedia service; and
    wherein the packet-oriented client communication systems are connected to each other via a peer-to-peer transmission protocol.

2. The absence assistance system as claimed in claim 1, wherein the absence assistance unit manages the communication connections directed to the absent communication subscriber in respect of a media type, a multimedia resource or combination of media type and multimedia resource required to provide the respective media type.

3. The absence assistance system as claimed in claim 1, wherein the multimedia-enabled communication system has a database that is configured as a peer-to-peer database, and wherein a peer-to-peer database unit is assigned to each absence assistant unit.

4. The absence assistance system as claimed in claim 1, wherein the communication system comprises a gateway unit with a peer-to-peer database, which is connected to the packet-oriented client communication systems via the peer-to-peer transmission protocol.

5. The absence assistance system as claimed in claim 1, wherein the packet-oriented client communication systems each have internal, at least partially multimedia-enabled communication terminals.

6. The absence assistance system as claimed in claim 1, wherein the at least one communication subscriber establishes a competent client communication system, a competent absence assistance unit or a combination of a competent client communication system and a competent absence assistance unit to manage the communication connection directed to the at least one communication subscriber, a network address of each established competent client communication system is stored in a peer-to-peer database unit.

7. The absence assistance system as claimed in claim 6, wherein backup resources and/or replacement resources available in adjacent client communication systems are determined via each absence assistance unit.

8. The absence assistance system as claimed in claim 7, wherein the determined backup resources and/or replacement resources are stored by each absence assistance unit at least as network addresses of the determined backup resources and/or replacement resources in the peer-to-peer database.

9. The absence assistance system as claimed in claim 6, wherein in the event of a multimedia communication connection received in a multimedia communication system whose multimedia service is not supported in the established client communication system, a media channel required to handle the multimedia service is rerouted to a further client communication system that supports the multimedia service and still has free multimedia resources.

10. The absence assistance system as claimed in claim 1, wherein individual internal communication terminals are provided as absence assistance units.

11. A method of providing absence assistance comprising:
asssigning an absence assistance unit to at least one communication subscriber;
the absence assistance unit managing at least one communication connection directed to that at least one communication subscriber when that at least one communication subscriber is absent;
the absence assistance unit determining available multimedia resources in packet-oriented communication systems in which the absence assistance unit is not provided to determine available multimedia services in other packet-oriented communication systems; and
if the absence assistance unit cannot support a multimedia service required by a communication connection directed to the at least one communication subscriber, the absence assistance unit forwarding the communication connection to another absence assistance unit in another packet-oriented communication system that supports a multimedia service required by the communication connection.

12. The method of claim 11 further comprising:
sending multimedia data stored in backup resources to the absence assistance unit after a failure of a client communication system assigned to the at least one communication subscriber occurs and the at least one communication subscriber registers with a further client communication system.

13. The method of claim 12 further comprising the at least one communication subscriber registering with another absence assistance unit of the further communication system.

14. The method of claim 11 wherein the absence assistance unit determining available multimedia resources in packet-oriented communication systems in which that absence assistance unit is not provided to determine available multimedia services in other packet-oriented communication systems via at least one search request configured to determine backup resources and/or replacement resources available in adjacent client communication systems.

15. The method of claim 14 further comprising informing the at least one communication subscriber and/or a system administrator if no available backup resources and/or replacement resources are determined via the at least one search request so an extension of a multimedia enabled communication system is initiatable.

* * * * *